United States Patent [19]

Rogers

[11] 4,040,687
[45] Aug. 9, 1977

[54] BALL RETAINER FOR BALL BEARINGS

[75] Inventor: Wilford P. Rogers, Bristol, Conn.

[73] Assignee: TRW Inc., Cleveland, Ohio

[21] Appl. No.: 580,059

[22] Filed: May 22, 1975

[51] Int. Cl.² .......................................... F16C 19/20
[52] U.S. Cl. .................................................. 308/201
[58] Field of Search ....................................... 308/201

[56] References Cited
U.S. PATENT DOCUMENTS

| 3,285,099 | 11/1966 | Parks, Jr. et al. | 308/201 |
| 3,788,714 | 1/1974 | Degioia et al. | 308/201 |

Primary Examiner—Richard A. Bertsch

[57] ABSTRACT

A ball retainer for ball bearings comprises a one-piece generally cylindrical member molded of reinforced plastic material. A plurality of ball receiving pockets are circumferentially-spaced substantially equidistantly from one another around one axial side of the cylindrical member. The ball receiving pockets have pocket entrance openings which open outwardly generally axially of the cylindrical member. A first plurality of the pockets have first entrance openings narrower than the diameter of spherical balls received in such pockets and the first entrance openings for the first plurality of pockets are defined between outwardly yieldable opposed fingers. The fingers yield to allow balls to move into the pockets and then close around the balls when they move past the fingers into the pockets. The first pockets are separated from one another by at least one of a second plurality of pockets having second entrance openings characterized by the absence of outwardly yieldable fingers and being of a width not less than the diameter of the balls received therein.

4 Claims, 5 Drawing Figures

BALL RETAINER FOR BALL BEARINGS

BACKGROUND OF THE INVENTION

This application relates to the art of ball retainers for use in ball bearing assemblies, and particularly to ball bearing retainers of a one-piece molded plastic type which snap onto the balls. The ball retainer of the present invention is particularly useful in ball bearings of the maximum capacity-type in which the balls are spaced closely together.

One-piece molded plastic ball retainers of known types include those described in U.S. Pat. No. 3,157,443 issued Nov. 17, 1964, to Draudt; U.S. Pat. No. 3,749,461 issued July 31, 1973 to Liss et al.; and U.S. Pat. No. 3,788,714 issued Jan. 29, 1974, to Degioia et al. Such retainers include outwardly projecting yieldable opposed fingers at the entrance opening of each ball receiving pocket.

In maximum capacity-type of ball bearings, the balls are positioned very close together and the common wall between adjacent ball receiving pockets must be relatively thin. In ball retainers for such bearings, opposed fingers at each pocket entrance opening would have to be extremely thin in order to allow simultaneous outward deformation of such fingers for snapping the retainer onto the balls. Fingers of relatively great thickness are not possible because there is insufficient width of plastic material in the common walls between adjacent pockets to permit simultaneous deformation of the fingers. Making the fingers extremely thin increases the likelihood that they will break and also reduces their holding capacity so they may be incapable of gripping balls with sufficient force to hold the retainer in position.

Previous retainers of the type described also have very large masses of plastic material in the common walls between adjacent pockets, and this inhibits uniform cooling of the plastic material and promotes warpage so that relatively close tolerances are difficult to maintain.

SUMMARY OF THE INVENTION

A ball retainer embodying the present invention comprises a generally cylindrical member molded in one piece of reinforced plastic material. A plurality of ball receiving pockets are circumferentially-spaced substantially equidistantly around one axial side of the cylindrical member. The pockets include a plurality of first pockets having first entrance openings which are slightly narrower than the diameter of balls receivable in such pockets, and such openings are defined between outwardly yieldable opposed fingers which snap over the balls for retaining same in the first pockets. The first pockets are separated from one another by at least one of a plurality of second pockets which are characterized by the absence of fingers at their entrance openings and such openings have a width which is not less than the diameter of balls receivable therein.

It has been found that providing relatively thick and rigid fingers on less than all of the pockets insures sufficient gripping of the balls to prevent displacement of the retainer from between the rings of the bearing assembly. This enables use of the ball retainer in bearings of the maximum capacity-type wherein the balls are spaced very small distances from one another and the common walls between adjacent pockets must be very narrow.

The improved retainer of the present application is used in a ball bearing assembly of the type including an outer ring having an outer diameter and an inner ring having an inner diameter. A plurality of circumferentially-spaced balls positioned between the rings received in the pockets of the ball retainer which is also positioned between the rings. The common walls of the ball retainer between adjacent pockets have a circumferential thickness measured at the thinnest part of the common wall which is less than 6 percent times the sum of the inner and outer diameters of the bearing.

The entrance openings defined between outwardly yieldable opposed fingers on the first pockets are preferably spaced outwardly from the pocket centers a distance substantially greater than the spacing of the entrance openings on the second pockets from such pocket centers.

The improved ball retainer of the present invention also has a plurality of circumferentially-spaced recesses in the axial side thereof opposite from the pockets, and such recesses are aligned with the common walls between adjacent pockets. Such recesses result in saving of material while maintaining high strength, and also promote even cooling of the plastic material to inhibit warpage and differential shrinkage. Centrally located raised areas within each recess and spaced above the bottoms thereof provide bearing areas aligned with the common walls of the pockets, and such bearing areas can be acted upon by ejector pins for ejecting the retainer from a mold or by an assembly tool for snapping the retainer onto balls between inner and outer rings of a bearing assembly.

BRIEF DESCRIPTION OF THE DRAWINGS

Further features and advantages of the present invention will be apparent to those skilled in the art from the following detailed description of a preferred embodiment made with reference to the accompanying drawings wherein.

DESCRIPTION OF THE PREFERRED EMBODIMENT

Figure 1:
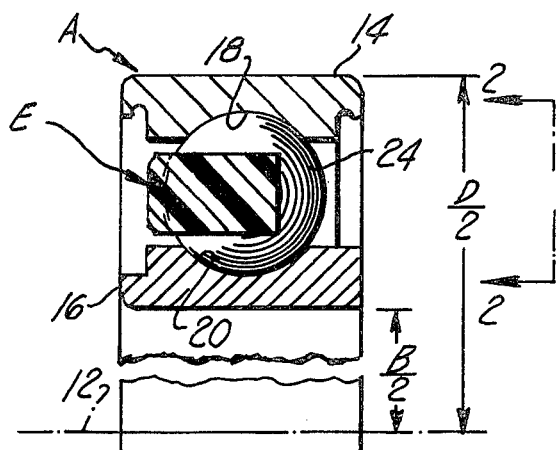
FIG. 1 is a fragmentary cross-sectional elevational view of a ball bearing assembly having the retainer of the present application incorporated therein.

With reference to the drawings, FIG. 1 shows a fragmentary cross-sectional portion of a generally cylindrical ball bearing assembly A having a longitudinal axis 12 about which outer and inner rings 14 and 16 are concentrically located. The inner ring 16 has an inner radius of B/2 so that the inner diameter of such inner ring, and the inner bore of the bearing assembly A, is equal to B. The outer ring 14 has an outer radius of D/2 so that its outer diameter is equal to D.

The outer ring 14 has a centrally located circumferential inner groove 18 defining an outer ball race, and the inner ring 16 has centrally located circumferential outer groove 20 defining an inner ball race. A plurality of circumferentially-spaced spherical balls 24 are positioned in the races 18 and 20 between the rings 14 and 16. The races 18 and 20 are curved at substantially the same radius as balls 24, as shown in FIG. 1, but extend around the balls 24 substantially less than 180°. As shown in FIG. 1, the construction is such that the inner and outer surfaces of the rings 14 and 16 are radially spaced apart.

The improved ball retainer E of the present application is positioned between the rings 14 and 16, and has pockets receiving the balls 24 for maintaining the balls 24 circumferentially spaced apart substantially equidistantly.

The ball retainer E is molded in one piece of reinforced plastic material. Although any suitable plastic material and reinforcement can be used, a glass reinforced polyamide or super polyamide has been found very effective. It will be recognized that other reinforcements including cotton, and other plastics including phenolics, can also be used. It has also been found advantageous to incorporate a lubricant in the plastic material, and such lubricants may take many forms, including graphite and molybdenum disulphide.

Figure 3:
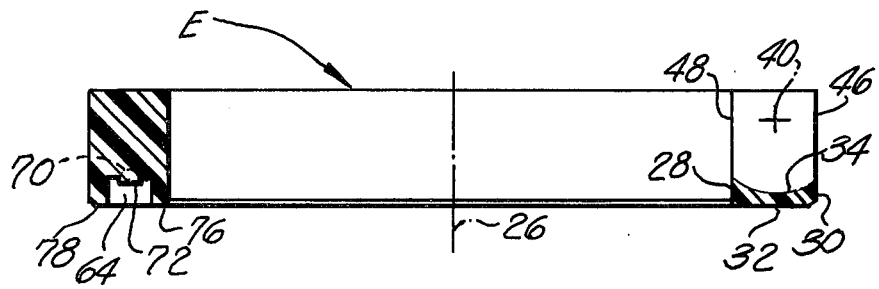
FIG. 3 is a cross-sectional elevational view looking generally in the direction of arrows 3—3 of FIG. 2.

The ball retainer E comprises a generally cylindrical member having a longitudinal axis 26, inner and outer circumferentially extending surfaces 28 and 30, and opposite axial sides, only one of which is referenced by numeral 32 in FIG. 3. The other side of the ball retainer E has a plurality of ball receiving pockets circumferentially spaced substantially equidistantly therearound. A first plurality of the ball receiving pockets are indicated by numerals 34, while a second plurality of such pockets are indicated by numerals 36.

The pockets 34, 36 have pocket centers 40, 42, respectively, lying on a common centerline 38 centrally located between the inner and outer surfaces 28 and 30 of the ball retainer E. The inner surfaces of such pockets 34 and 36 lie on the surface of a sphere with its center located at 40 or 42 and having a radius substantially the same (possibly slightly larger) as the radius of spherical balls 24.

The outer and inner edges 46 and 48 of one pocket 34 are shown in FIG. 3, and it will be recognized that the radial outer and inner edges of all the pockets 34 and 36 lie on the surfaces of common cylinders coincidental with the inner and outer surfaces 28 and 30 of the retainer E. The pockets 34 and 36 are radially open between such inner and outer edges, and due to the fact that the surfaces of such pockets are spherical, such radial openings have circular diameters less than the diameter of a ball 24.

Each first pocket 34 has a first entrance opening generally indicated at 52 between the tips of resiliently outwardly deformable opposed fingers 54, and such entrance openings 52 are slightly narrower than the diameter of a ball 24, and narrower than the maximum width of such pockets 34 along centerline 38. Such first entrance openings 52 are also spaced outwardly a substantial distance from centerline 38. The second pockets 36 are characterized by the absence of any outwardly deformable fingers as shown at 54 for pockets 34. Instead, the pockets 36 have entrance openings generally indicated at 56 which have a width greater than the width of openings 52, and preferably not less than the diameter of a ball 24. Such entrance openings 56 for pockets 36 also terminate at a shoulder or flat end surface 58 so that the entrance openings 56 are located substantially closer to centerline 38 than the entrance openings 52. When it is stated that the entrance openings 56 have a width not less than the diameter of a ball 24, it will be recognized that it is preferred that a ball 24 be freely received in each pocket 36. However, it will be recognized that a ball 24 can have a slight interference fit through each opening 56. In the preferred form, the second pockets 36 extend spherically beyond the centerline 38 to intersect with the flats 58 instead of extending perpendicularly from the centerline 38 out to the flats 58.

Adjacent pockets 34 and 36 have common walls 60, and the fingers 54 have a thickness over a major portion of their length which is greater than one-half of the thickness of such common walls 60 as measured at the centerline 38. This insures maximum holding power for the fingers 54 so that such fingers are not subject to breakage when deforming outwardly over the balls 24, and also insures maximum holding power.

In the preferred arrangement, each common wall 60 has a circumferential thickness along the centerline 38 which is less than 6 percent times the sum of the outer diameter of ring 14 and the inner diameter of ring 16. With such a thickness for the common walls 60, the ball retainer E can be used in maximum capacity-type of ball bearing assemblies to insure substantially uniform spacing of the balls while maintaining maximum holding capacity to prevent displacement of the retainer.

Figure 5:
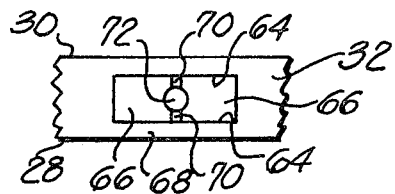
FIG. 5 is a partial side elevational view looking generally in the direction of arrows 5—5 of FIG. 4.
Figure 2:
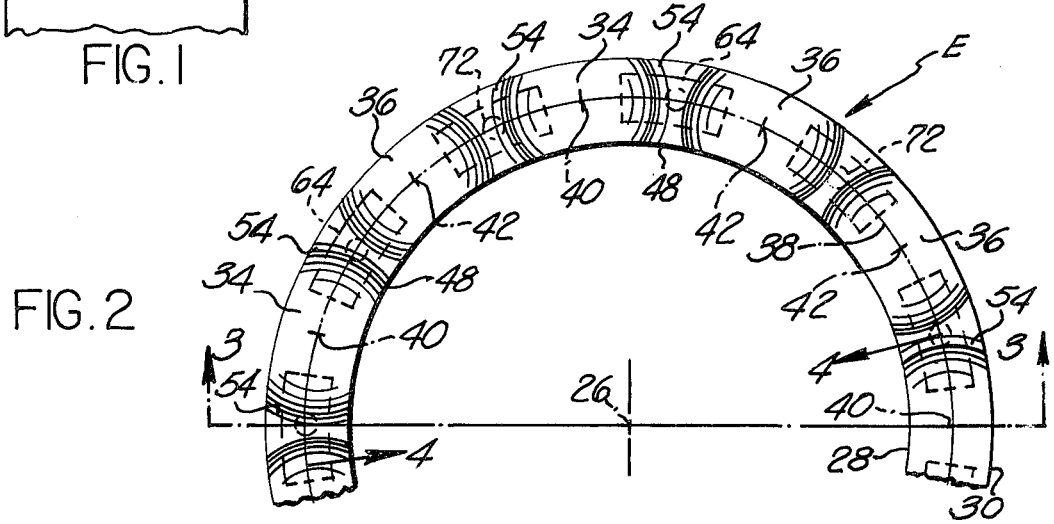
FIG. 2 is a side elevational view of the ball retainer of the present application looking generally in the direction of arrows 2—2 of FIG. 1, and with the remainder of the ball bearing assembly omitted.
Figure 4:
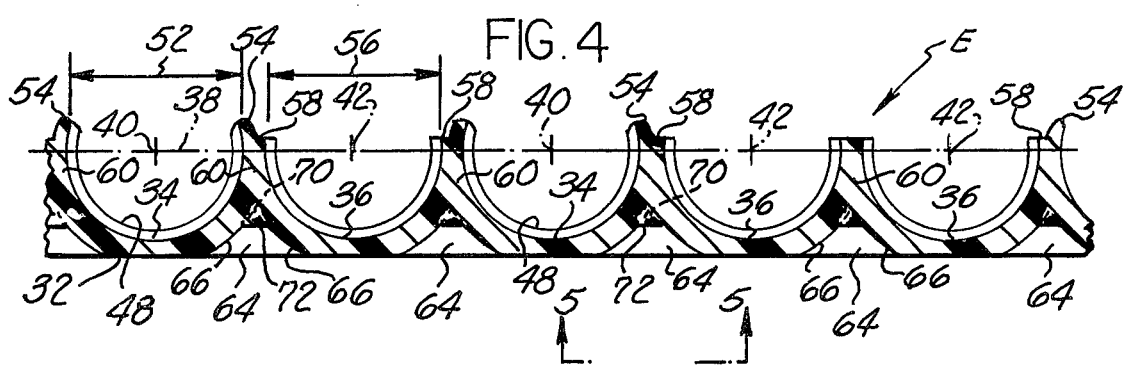
FIG. 4 is a cross-sectional view looking generally in the direction of arrows 4—4 of FIG. 2.

The side 32 of ball retainer E opposite from the pockets 34 and 36 lies in a plane substantially perpendicular to the axis 26. A plurality of circumferentially-spaced recesses 64 are formed in retainer E. The recesses 64 extend into the retainer E from the side 32 and are located in alignment with the common walls 60. In the preferred arrangement, the recesses 64 are located inwardly of inner and outer surfaces 28 and 30, and have a generally rectangular entrance opening shape. The recesses 64 have sidewalls 66 which converge in a direction from the side 32 toward the side having the pockets 34 and 36 therein. The recess sidewalls 66 preferably extend substantially parallel to the curved surfaces of the pockets 34 and 36 as shown in FIG. 4. With this arrangement, continuous webs or flanges 68 extend around the side 32 past the recesses 64 to provide optimum strength for ball retainer E, while material is saved by providing such recesses. In addition, as best shown in FIGS. 3–5, the recesses 64 result in a generally uniform thickness of plastic material being provided so that uniform cooling is achieved to minimize warpage and differential shrinkage which would otherwise make it difficult to maintain tolerances without expensive subsequent machining of the molded retainer. The recesses 64 have bottoms 70 which are located between one-third and one-half the distance from the side 32 toward the centerline 38. Centrally located flat circular areas 72 are spaced upwardly from recess bottoms 70 to define circular bearing areas centrally located between the inner and outer surfaces 28 and 30 of the retainer E. Such circular bearing areas 72 have a diameter approximately one-third of the distance between the inner and outer surfaces 28 and 30 of the retainer E, and extend inwardly from the side 32 approximately one-third of the distance to the centerline 38. Such centrally located bearing areas 72 serve as bearing areas for ejector pins for ejecting ball retainer E from a mold or for being acted upon by fingers on an assembly tool which engages all of such bearing areas for simultaneously snapping all of the pockets 34 onto the balls 24 assembled between the rings 14 and 16. This makes it possible to apply force on the ball retainer E directly in line with the common walls 60 to minimize deformation or the likelihood of breakage of other parts of such retainer.

The intersections between the inner and outer surfaces 28 and 30 with the side 32 are preferably chamfered as shown at 76 and 78. This breaks sharp edges, and further insures substantially uniform sections for optimum uniform cooling of the ball retainer E after it is molded.

The first entrance openings 52 are spaced outwardly a substantial distance from the centerline 38, while second entrance openings 56 are spaced only slightly outwardly from centerline 38 and are located substantially closer thereto than the first entrance openings 52. This allows the fingers 54 and possibly the common walls 60, to freely deform outwardly for first snapping the balls through the first entrance openings 52 into the first pockets 34 without interference from adjacent balls which later move through the second entrance openings 56 into the second pockets 36.

In the specific retainer shown and described, there are an odd number of pockets so that two of the first pockets 34 are spaced from one another by two of the second pockets 36, while all the remainder of the pockets 34 are separated from one another by only one of the pockets 36. Obviously, the retainer E can also be used in bearings having an even number of balls and in that case, the retainer E is made with an even number of pockets, and the pockets 34 and 36 alternate circumferentially around the side of the retainer.

The rings 14 and 16, and balls 24, can be assembled in any of the well-known manners as by eccentrically positioning the ring 16 within the ring 14, with the balls 24 bunched together in the race 18 opposite from the direction in which the ring 16 is eccentrically displaced. Mechanical force is then applied to the rings for moving them in a direction to align their longitudinal axes and such rings deform so that the balls snap between them. The bearing assembly can be notch-filled by providing an axially extending arcuate groove or notch in the inner and outer surfaces respectively of rings 16 and 14. Such notches have a depth slightly less than the depth of the races 18 and 20, and individual balls can be forced one at a time through the aligned notches into the races 18 and 20. The outer ring 14 can be axially split so it can be radially expanded over balls held by a fixture in the race of the inner ring. The outer ring 14 can have an inner diameter on one side of the race 18 greater than on the other side of such race so that such ring can be heated or mechanically stretched to fit over the balls and the inner ring.

Once the rings and balls are assembled, a fixture on one side of the assembly spaces the balls substantially equidistantly, while the retainer E is moved axially between the rings and onto the balls from the opposite side of the assembly. In some cases, it is possible to assemble the retainer with the balls and the inner ring, and then position the outer ring over that assembly.

Although the dimensions of the retainer E will vary widely for different sizes and load capacities of bearing assemblies, and such dimensions can also vary for the same bearing size and load capacity, dimensions of one specific retainer will be given by way of example and illustration only, and are not to be taken in a limiting sense. The retainer E shown in the drawing has a total of eleven ball receiving pockets, with five pockets having fingers and six pockets lacking fingers. In a retainer for use with a bearing having balls of approximately 0.625 inch diameter, the diameters of inner and outer retainer surfaces 28 and 30 are approximately 2.243 and 2.871 inches. The pockets 34 and 36 have spherical surfaces at a radius of approximately 0.320 inch from the pocket centers 40 and 42. The width of the retainer E from the side 32 to the tips of the fingers 54 is approximately 0.493 inch. The thickness of retainer E between the base of each pocket 34 or 36 and side 32 is approximately 0.045 inch. The entrance openings 52 are located approximately 0.128 inch from centerline 38, which the entrance openings 56 are located approximately 0.045 inch from centerline 38. The thickness of common walls 60 along centerline 38 is approximately 0.09 inch. Over a major portion of their length, fingers 54 have a thickness substantially greater than 0.045 inch, and flats 58 have a width parallel to centerline 38 of approximately 0.015 inch. Entrance openings 52 have a width along centerline 38 of approximately 0.614 inch, while entrance openings 56 have a width along centerline 38 of approximately 0.635 inch. Recesses 64 have a circumferential entrance width of approximately 0.25 inch and a radial entrance width of approximately 0.15 inch. Recess bottoms 70 are located approximately 0.160 inch from the side 32, and the flat circular areas 72 are located approximately 0.110 inch from the side 32, and have a diameter of approximately 0.094 inch. Inner chamfer 76 extends at an angle of approximately 20° to the side 32, while the chamfer 78 extends at an angle of approximately 15° to the side 32. Chamfer 76 extends acially approximately 0.030 inch, while chamfer 78 extends axially approximately 0.15 inch.

Although the invention has been shown and described with respect to a preferred embodiment, it is obvious that equivalent alterations and modifications will occur to others skilled in the art upon the reading and understanding of this specification. The present invention includes all such equivalent alterations and modifications.

Having thus described my invention, I claim:

1. Apparatus comprising a generally cylindrical ball bearing retainer member having a longitudinal axis, a plurality of ball receiving pockets circumferentially-spaced substantially equidistantly around one axial side of said cylindrical member and having pocket entrance openings which open axially outwardly generally parallel to said axis, said pockets including a plurality of first pockets having first entrance openings defined between opposite outwardly yieldable fingers having finger tips spaced apart a distance less than the maximum width of each said first pocket, a plurality of second pockets having second entrance openings, said second entrance openings being defined by portions of said cylindrical member other than yieldable fingers and being of greater width than said first entrance openings, said first pockets being separated from one another by at least one of said second pockets, said pockets having centers and said first entrance openings being spaced outwardly from said centers of said first pockets a substantially greater distance than the spacing of said second entrance openings from said centers of said second pockets, adjacent pockets having common walls, and said yieldable fingers each having a thickness over a major portion of their length which is greater than one-half the thickness of each said common wall measured on a line extending between the centers of adjacent pockets.

2. The apparatus of claim 1 wherein said retainer is usable in a ball bearing assembly including an outer ring having an outer diameter and an inner ring having an inner diameter, each said common wall having a circumferential thickness measured between said centers which is less than 6 percent times the sum of said outer and inner diameters.

3. The apparatus of claim 1 wherein said cylindrical member has a side opposite said one axial side and adjacent pockets are separated by common walls, and a plurality of circumferentially-spaced recesses in said opposite side aligned with said common walls.

4. The apparatus of claim 3 wherein said common walls have flat end surfaces on opposite sides of said second entrance openings and said fingers extend outwardly of said flat end surfaces on opposite sides of said first entrance openings.

* * * * *